No. 731,895. PATENTED JUNE 23, 1903.
G. W. HANCOCK.
FLOUR SIFTER.
APPLICATION FILED OCT. 1, 1902.
NO MODEL.
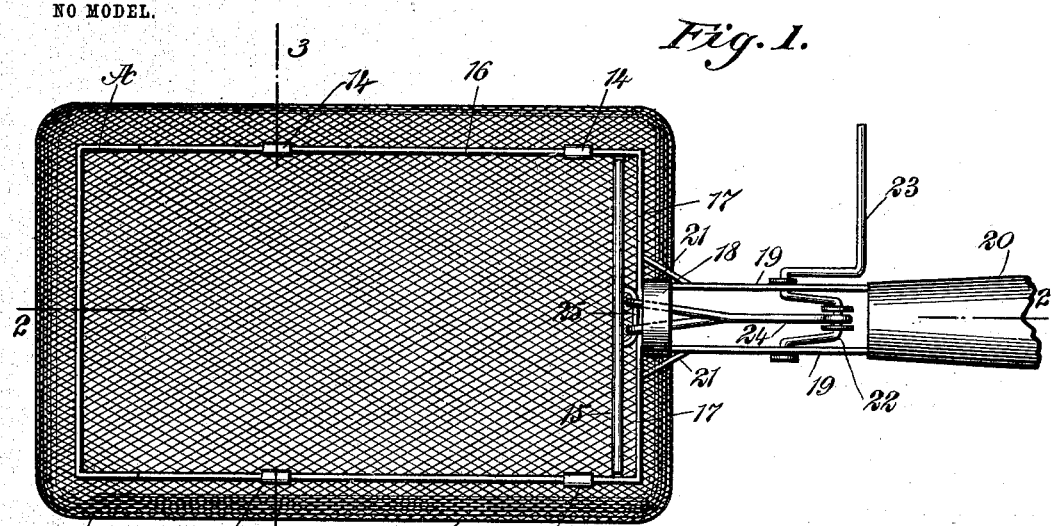
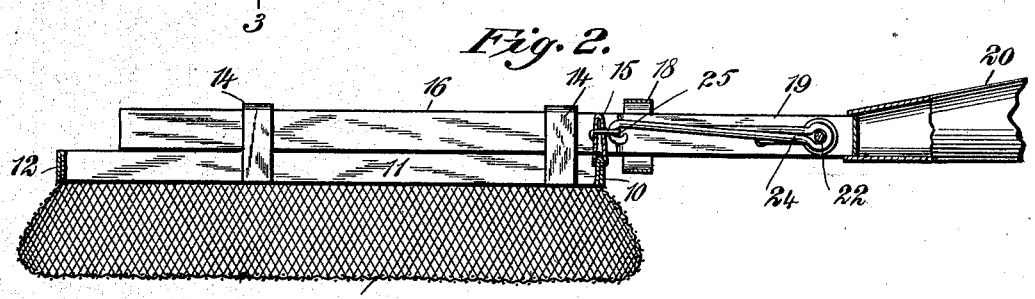
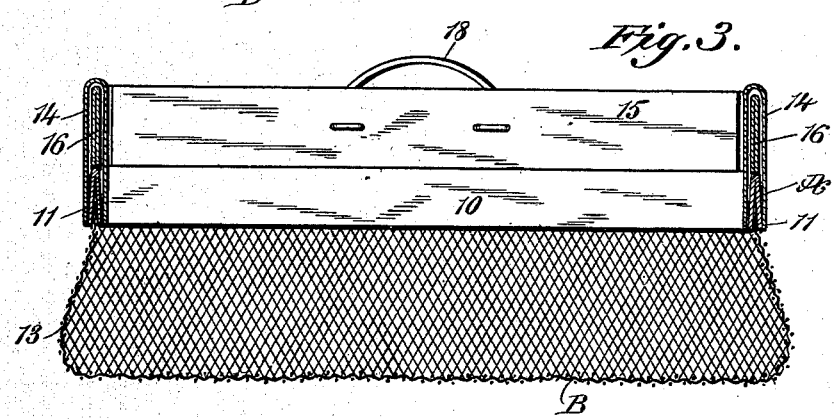
WITNESSES:
INVENTOR
George W. Hancock
BY
ATTORNEYS No. 731,895.

Patented June 23, 1903.

UNITED STATES PATENT OFFICE.

GEORGE WINN HANCOCK, OF LYNCHBURG, VIRGINIA.

FLOUR-SIFTER.

SPECIFICATION forming part of Letters Patent No. 731,895, dated June 23, 1903.

Application filed October 1, 1902. Serial No. 125,481. (No model.)

*To all whom it may concern:*

Be it known that I, GEORGE WINN HANCOCK, a citizen of the United States, and a resident of Lynchburg, in the county of Campbell and State of Virginia, have invented a new and Improved Flour-Sifter, of which the following is a full, clear, and exact description.

The purpose of my invention is to provide a simple, durable, and economic manually-operated device adapted to sift flour, meal, and other powdered or pulverized substances faster and with more ease and cleanliness than can be done by the old-style wood or tin rimmed hand-operated sifter.

Another purpose of the invention is to construct a horizontally-reciprocating sifter which can be conveniently held in one hand and operated by the other, in which all agitators, beaters, or other mechanical devices operating over the screen or sieve surface are discarded, thus preventing dirt, bugs, worms, weevils, &c., from being pressed or ground through the meshes of the sieve, thereby preserving the sifted material clean and pure.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved sifter. Fig. 2 is a longitudinal vertical section on the line 2 2 of Fig. 1, and Fig. 3 is an enlarged transverse section on the line 3 3 of Fig. 1.

The body A of the sifter is of skeleton construction and is preferably made of metal. Said body consists of a rear member 10, side members 11, and a front member 12, and these members are preferably bifurcated and open at their lower ends to receive the edges of the material 13 to form the sieve or screen B of the device. Preferably in forming the said screen or sieve the sides and ends thereof are made to extend or bulge out beyond the corresponding members of the frame A; but the material of the screen or sieve may be otherwise attached to the frame A, if found desirable. Loops 14 extend upward from the side members 11 of the frame, and at the rear member 10 of the frame an upper extension 15 is preferably provided of substantially equal length to that of the rear member 10. The extension member 15 may be a portion of the rear member 10, if desired.

The sieve just described is supported upon track-bars 16, which track-bars correspond to the side bars 11 of the sieve-frame A and are immediately over the said side bars of the frame, being loosely passed through the loops 14, as is especially shown in Figs. 1 and 2. Cross-bars 17 are carried from the inner ends of the track-bars 16 in direction of each other, and the said cross-bars 17 are continued in parallel lines at a suitable distance apart rearward from the frame of the sieve to form handle-bars 19. (Shown best in Fig. 2.) The said handle-bars 19 connect with the track-bars 16 and are preferably passed through a ring 18, which ring is attached to the transverse bars 17, as is also best shown in Fig. 1, and the handle-bars 19, at their rear ends, are preferably attached to a cylindrical handle-section 20 for convenience in holding the device. The handle-bars 19 are ordinarily braced to the transverse bars 17 by diagonal brace-bars 21. (Also shown best in Fig. 1.)

A crank-arm 22 is journaled in the handle-bars 19, and at one end of the crank-arm 22, preferably its right-hand end, a crank-handle 23 is secured or is made integral with the crank-arm, by means of which said crank-arm is operated. The crank-arm 22 is connected with the sieve-frame A through the medium of a link or bar 24, which is pivotally attached to the crank-arm 22 and to the upper extension-bar 15 at the rear of the said sieve-frame A. This link or connecting-bar 24 is preferably made of wire bent upon itself to form an eye which receives the crank-arm 22, and the two ends of the wire are attached to the extension-section 15 of the frame A through the medium of a loop 25 or by other means, if found desirable.

In the operation of the device it is held in the left hand, said hand grasping the cylindrical portion 20 of the handle of the device, and with the right hand the crank-handle 23 is turned, which imparts rotary movement to the crank-arm 22 and a reciprocating movement in a horizontal direction to the sieve. Thus it will be observed that the material to be sifted is constantly shifted in the sieve and will find its way readily through the meshes thereof and that all coarse and foreign matter will be retained in the sieve, from which said waste material may be conveniently emptied.

Having thus described my invention, I claim as new and desire to secure by Letters Patent—

1. The combination with a sieve, of a frame having vertical walls formed of flat bars, pairs of oppositely-disposed loops embracing the sides of said bars and having their top portion extended above said bars, flat track-bars loosely fitting in said loops and vertically disposed above the side walls of said frame, transverse extensions from the track-bars, spaced handle-bars extending from the rear transverse extensions of the track-bars, a ring inclosing the forward end of said handle-bars at their junction with the frame, a crank-arm pivoted between the handle-bars, a crank-handle connected with said arm, a link formed of wire and bent at its center into an eye to receive said crank-arm, an upwardly-extending section at the rear of the sieve-frame, and a horizontally-disposed loop secured at the center of said extension-section, the ends of said wire link being pivotally attached to said loop, as specified and for the purpose set forth.

2. The herein-described flour-sifter having a rectangular frame formed of vertically-disposed flat bars, a sieve proper carried by said frame and extending downwardly from the lower edge thereof, the side walls of said sieve proper being bulged at their lower sides to extend outwardly beyond said frame, pairs of oppositely-disposed loops secured to the longer sides of said frame and extending upwardly therefrom in the same vertical plane therewith, an upper rectangular frame formed of a single piece of flat material, the longer sides of said frame passing through said loops to form flat track-bars, said loops being longitudinally movable on said bars, the rear ends of said flat track-bars being bent inwardly toward each other and then outwardly parallel with each other to form spaced handle-bars, a crank-arm pivoted between said handle-bars, a crank-handle connected with the crank-arm, and a link connection between the crank-arm and the frame of the sieve proper, as described.

In testimony whereof I have signed my name to this specification in the presence of two subscribing witnesses.

GEORGE WINN HANCOCK.

Witnesses:
 WALTER SMITH,
 J. R. GIELEIN.